(12) United States Patent
Wang

(10) Patent No.: US 8,331,397 B2
(45) Date of Patent: Dec. 11, 2012

(54) FAST SELECTION OF COOPERATIVE NODES

(75) Inventor: Xiangyu Wang, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 220 days.

(21) Appl. No.: 12/682,811

(22) PCT Filed: Oct. 15, 2008

(86) PCT No.: PCT/IB2008/054237
§ 371 (c)(1),
(2), (4) Date: Apr. 13, 2010

(87) PCT Pub. No.: WO2009/050656
PCT Pub. Date: Apr. 23, 2009

(65) Prior Publication Data
US 2010/0246423 A1    Sep. 30, 2010

(30) Foreign Application Priority Data
Oct. 19, 2007 (EP) .................................. 07118842

(51) Int. Cl.
*H04L 12/413* (2006.01)
(52) U.S. Cl. ................ 370/445; 370/448; 370/310
(58) Field of Classification Search .............. 370/341, 370/348, 431, 433, 445, 448, 450, 454, 456, 370/462
See application file for complete search history.

(56) References Cited

U.S. PATENT DOCUMENTS

| | | | | |
|---|---|---|---|---|
| 4,945,532 A | * | 7/1990 | Hald | 370/245 |
| 7,027,462 B2 | * | 4/2006 | Benveniste | 370/447 |
| 7,075,890 B2 | | 7/2006 | Ozer et al. | |
| 2005/0243788 A1 | | 11/2005 | Janczak | |
| 2006/0056340 A1 | | 3/2006 | Hottinen et al. | |

OTHER PUBLICATIONS

Bletsas et al: A Simple Distributed Method for Relay Selection in Cooperative Diversity Wireless Networks, Based on Reciprocity and Channel Measurements; Vehicular Technology Conference, 2005, IEEE, vol. 3, May 2005, pp. 1484-1488.
Shankar et al: "Cooperative Communication MAC (CMAC)—A New MAC Protocol for Next Generation Wireless LAN's"; 2005 International Conference on Wireless Networks, Communications and Mobile Computing, IEEE, vol. 1, Jun. 2005, pp. 1-6.
Nosratinia et al: "Cooperative Communication in Wireless Networks"; IEEE Communications Magazine, Oct. 2004, pp. 74-80.
Ganti et al: "Differentiated Back-Off for Ethernet"; Canadian Conference on Electrical and Computer Engineering, May 2005, IEEE, pp. 417-420.
Chen et al: "A Channel Reservation Procedure for Fading Channels in Wireless Local Area Networks"; IEEE Transactions on Wireless Communications, vol. 4, No. 2, Mar. 2005, pp. 689-699.
Zheng et al: "Protocol Design and Performance Analysis of Opportunistic Multi-Channel Medium Access Control"; Jan. 30, 2004, 26 Page Document.
Wang et al: "Opportunistic Packet Scheduling and Media Access Control for Wireless LANs and Multi-Hop Ad Hoc Networks"; IEEE Communications Society, WCNC 2004, pp. 1234-1239.
Bertsekas et al: "Data Networks"; Prentice Hall, 1992, Chapter 4, "Multiaccess Communication."

* cited by examiner

*Primary Examiner* — Brenda H Pham
(74) *Attorney, Agent, or Firm* — Larry Liberchuk

(57) ABSTRACT

The present invention relates to a method, apparatuses, a system, and a computer program product for selecting at least one cooperative node from multiple cooperative nodes (21 to 23) for receiving a signal from a source node (10), wherein at least two stages of a backoff process are provided, in which the candidate cooperative nodes (21 to 23) determine respective backoff numbers according to their channel conditions to the source node (10), wherein the second stage is performed if the first stage was not successful or if a second cooperative node shall be selected.

16 Claims, 8 Drawing Sheets

FAST SELECTION OF COOPERATIVE NODES

FIELD OF THE INVENTION

The present invention generally relates to apparatuses, a system and a method of selecting at least one cooperative node in a transmission system such as—but not restricted to—a wireless local area network (WLAN).

BACKGROUND OF THE INVENTION

Wireless local area networks (WLANs) as defined e.g. in the IEEE 802.11 specifications are almost omnipresent today. The 802.11 standard makes it mandatory that all stations implement a distributed coordination function (DCF) which is a form of carrier sense multiple access with collision avoidance (CSMA/CA). CSMA/CA is a contention-based protocol making certain that all stations first sense the medium before transmitting. The main goal is to avoid having stations transmit at the same time, which results in collisions and corresponding retransmissions. If a station wanting to send a frame senses energy above a specific threshold on the medium (which could mean the transmission of another station), the station wanting access will wait until the medium is idle before transmitting the frame. The collision avoidance aspect of the protocol pertains to the use of acknowledgements that a receiving station sends to the sending station to verify error-free reception. Although somewhat more complex, this process of accessing the medium can be seen as a meeting where everyone is polite and each person only speaks when no one else is talking. In addition, participants who understand what the person is saying nod their head in agreement.

Multihop relaying technology, where a signal is relayed through various network nodes, is a promising solution for future cellular and ad hoc wireless communications systems, such as for example WLAN or sensor networks, in order to achieve broader coverage and to mitigate wireless channels impairment without the need to use high power at the transmitter. Recently, a new concept that is being actively studied in multihop-augmented networks is multiuser cooperative diversity, where several terminals or network nodes form a kind of coalition to assist each other with the transmission of their messages. In general, cooperative relaying systems have a source node multicasting a message to a number of cooperative relays or nodes, which in turn resend a processed version to the intended destination node. The destination node combines the signal received from the relays, possibly also taking into account the source's original signal.

In S. Shankar et al., "Cooperative communication MAC (CMAC)—A New MAC protocol for Next Generation Wireless LANs", IEEE WireComm, June 2005, and Bletsas et al., "A Simple Cooperative Diversity Method based on Network Path Selection", IEEE Journal on Selected Areas of Communications, March 2006. (MIT), two methods are described, which are based on so-called "backoff process" which is widely used in wireless communication systems, especially in WLAN and WPAN systems like IEEE 802.11 and IEEE 802.15 as well as wired communication systems, such as IEEE 802.3 (Ethernet). The backoff process is used in communication systems for random access to a channel among a number of multiple contending stations, as indicated for example in D. Bertsekas and R. Gallager, "Data Networks", Chapter 4, Prentice Hall, 1992. Usually it is combined with the CSMA protocol. The backoff process has been introduced to allow fair access to a channel by all participating stations and to adjust transmissions according to network congestion level in a distributed way.

Before a station starts a transmission, it selects a random backoff number, BO, within a certain contention windows (CW), say [0, CW]. A station selects the random number, BO, uniformly across the contention window so as to achieve fair access to the channel. If a station discovers after sending a packet that the transmission resulted in a collision because other stations were transmitting, the station will double its contention window to 2*CW and repeat the process. To discover a collision, a station either uses collision detection circuitry or relies on the receiver to inform it.

The backoff process may be reused for the purpose of selection of a cooperative node. In both solutions only single stage backoff process is designed. In Bletsas et al., "A Simple Cooperative Diversity Method based on Network Path Selection", IEEE Journal on Selected Areas of Communications, March 2006. (MIT), the backoff process is suggested to be reused for selection of a best cooperative node.

FIG. 2 shows a flow diagram of a basic of operation according to the backoff process which may be used for selecting a cooperative node. Here according to its instantaneous channel condition, each cooperative node determines in step S101 a backoff number (BO) that is inversely proportional to the instantaneous channel condition (CC) with a factor of lambda. It then senses the channel and if it determines in the loop procedure of steps S102 to S105 that the channel is idle for BO slots, it then starts a transmission in step S106. Otherwise, if it determines in step S103 that the channel is busy, it defers and waits until the channel is idle again. Hence a cooperative node with the best channel condition will determine a smallest BO number and will seize the channel when the channel is idle for BO slots.

While this method is simple to implement and can be easily accepted because the backoff process is well known, it has the difficulty to choose an appropriate factor lambda. This is because the distribution of cooperative nodes in reality is unknown and is unlikely to follow a uniform distribution. Furthermore, there could be a case where all cooperative nodes have either very good channel condition or very bad channel condition. For example, if cooperative nodes have a lognormal distribution but with different mean values, the factor lambda has to be chosen to a large number so as to reduce potential collision between cooperative nodes with unknown distributions. However, the overhead will be increased as a larger lambda means a larger BO number and a larger idle time before contention.

This leads to the problem that the backoff process is targeted for fair arbitration of competing stations while it is intended to be unfair in selection of a best cooperative node. Therefore applying backoff process without knowing the distribution of cooperative nodes will not be efficient. If for example cooperative nodes have relative strong channel conditions, a lambda value of e.g. 27 may result in 95% successful selection of the best cooperative nodes with an average delay of e.g. 10 slots. Otherwise, if cooperative nodes have relative weak channel conditions, the above lambda value of 27 may result in 96% successful selection but the average delay in selection may now be 55 slots, which is substantially larger. Thus, a simple backoff-based selection procedure will not suffice to provide fast selection of the best cooperative node.

SUMMARY OF THE INVENTION

It is an object of the present invention to provide a selection scheme for fast selection of the best cooperative node.

This object is achieved by apparatuses as claimed in claim 1 and 10 and by a method as claimed in claim 15. In a software-based implementation, the above object may be achieved by a computer program product which comprises code means for producing the steps of the above method when run on a computer device.

Accordingly, an improved selection of a cooperative node is proposed which is based on the backoff process. By introducing multiple selection stages and making use of early feedback, a best cooperative node can be identified with littler overhead. Another advantage is that the overhead remains almost unchanged regardless of potential distributions of cooperative nodes. In the proposed multi-stage based backoff procedure, best cooperative nodes are thus not selected in one shot, but rather in multiple short rounds. In the first stage, the primary goal is for a sender to learn about the distribution of its cooperative nodes roughly. With this knowledge from the first round, a source node or sender conducts selection in a finer degree in at least one following stages by (optionally) providing feedback to its cooperative nodes. The existence of cooperative nodes may be know or unknown to a sender. The proposed method is especially well suited for practical cases in which distribution of cooperative nodes in terms of channel condition is unknown to source node, or in which cooperative nodes are hidden from each other and collision may occur in the backoff process.

The proposed method can be used iteratively also for selecting not only one best node, but also a first few best nodes for cooperation purpose.

The apparatus in or at the candidate cooperative nodes may be adapted to determine based on the reaction of the source node at the end of each backoff stage, whether a current stage of said backoff process was successful. The proposed selection scheme thus allows fast selection of potential cooperative nodes. In a more specific example, the apparatus in or at the cooperative node may be adapted to determine whether the current stage was successful, based on at least one of an absence of a response from the source node and a reaction made by another candidate cooperative node. The apparatus may then determine the second backoff number based on an information obtained from the determination whether the current stage was successful. In an alternative more specific example, the apparatus in or at the cooperative node may be adapted to determine whether the current stage was successful, based on a feedback from the source node to cooperative nodes at the end of the first stage, the feedback comprising information about whether a selection of a cooperative node was performed successfully or in which slot the selection has failed.

As an example, the feedback from the source node may comprise an information indicating which cooperative nodes are excluded from the second stage of the backoff process.

According to another example, the apparatus in or at the cooperative node may be adapted to use a number of idle slots in the first stage of the backoff process to calculate a corresponding channel condition number. In a specific example, the corresponding channel condition number may be subtracted from an original channel condition number of the first stage in order to calculate the second backoff number. As an option, the feedback from the source node may comprises a suggested new value of a factor to be combined with the corresponding channel condition number to obtain the second backoff number.

Further advantageous developments are defined in the dependent claims.

BRIEF DESCRIPTION OF THE DRAWINGS

The present invention will now be described based on various embodiments with reference to the accompanying drawings in which.

DETAILED DESCRIPTION OF EMBODIMENTS

Figure 1:
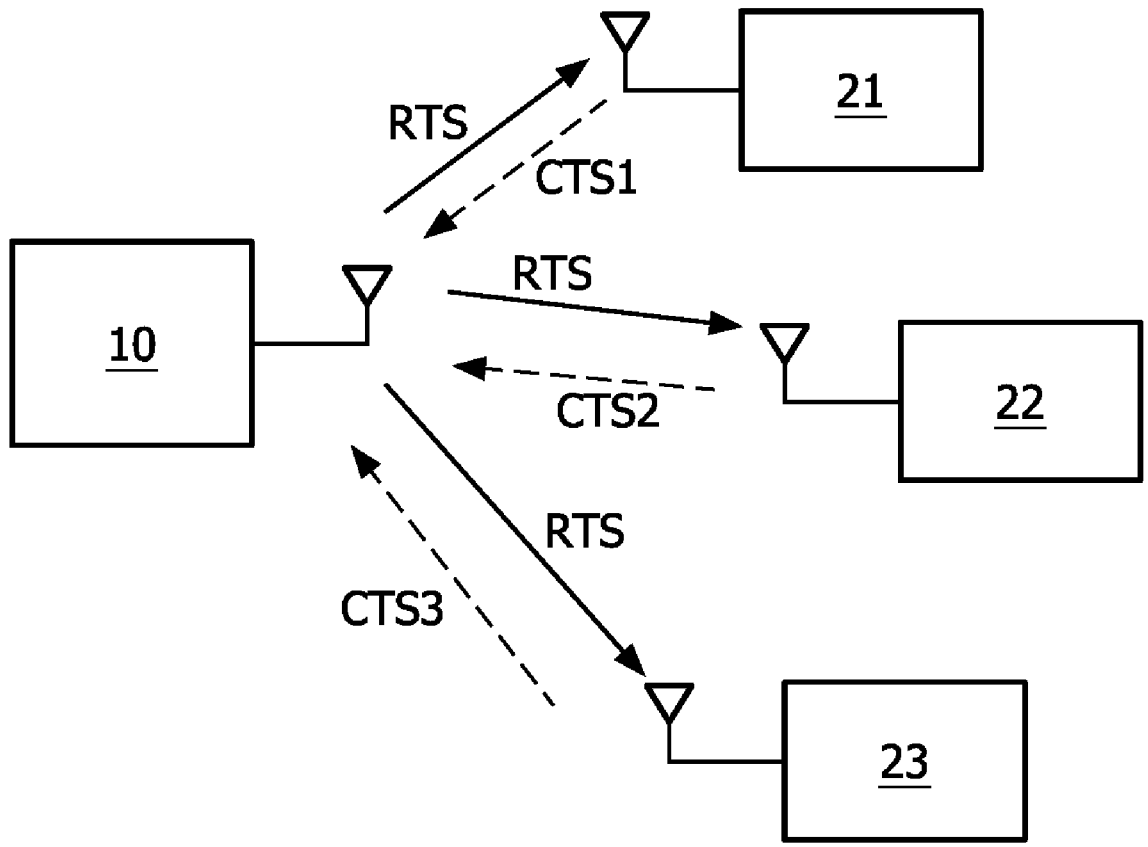
FIG. 1 shows a schematic block diagram of a wireless network environment involving a handshake procedure according to various embodiments.

In the following, various embodiments are described on the basis of a wireless ad-hoc network environment, e.g. WLAN, as shown in FIG. 1 and involving an RTS/CTS handshaking procedure.

According to FIG. 1. a source node (or sender) 10 has access to an exemplary number of three candidate cooperative nodes (or stations) 21 to 23.

The cooperative nodes 21 to 23 of the source node 10 may have relative good channel conditions to the source node. When the source node sends out a packet, like RTS (Request-To-Send), soliciting the best cooperative node, each cooperative node 21 to 23 multiplies its received power, which indicates its channel condition CC to the source node 10, by a pre-determined small value of lambda. The multiplication results in a backoff number BO that is proportional to channel condition, and that determines the transmission timings of the respective responses CTS1, CTS2, and CTS3 of the cooperative nodes 21 to 23. A small value of lambda means a small backoff number. This implies the source node 10 and the cooperative nodes 21 to 23 can learn about their cooperative nodes within just a few backoff slots.

Figure 3:
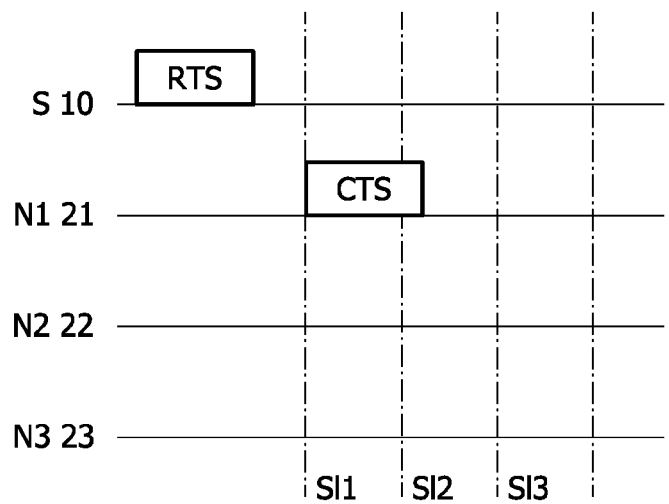
FIG. 3 shows a schematic signaling diagram of a single-stage backoff process.

FIG. 3 shows a schematic signaling diagram of a single-stage backoff process. For the three cooperative nodes 21 to 23 that receive an RTS packet from the source node 10, each determines a BO number. In this case, the cooperative nodes N1 21, N2 22, and N3 23 have channel conditions CC of 0.1, 0.5, and 0.8 (smaller numbers mean better conditions) respectively. A small lambda has been agreed beforehand, which is 3. Hence multiplying channel conditions CC and lambda and round off to the closest large integer number gives 1, 2, and 3, respectively. That is the first cooperative node (N1) 21 will send in slot S11; N2 22 will send in slot S12; and N3 23 will send in slot S13.

The first cooperative node (N1) 21 sends a reply packet, such as CTS (Clear-To-Send), back to the source node 10 in slot S11. Carrier sensing of the other cooperative nodes N2 22 and N3 23 will sense this transmission and hold back their transmission. Hence the best node, N1 21 in this case, will be identified as the best cooperative node.

This case is a simple case and selection is already finished in one stage.

However, when all cooperative nodes 21 to 23 have bad conditions, it is difficult to perform selection successfully in a single backoff stage unless the lambda value is chosen to be very large. An example would be that the cooperative nodes 21 to 23 have conditions of 0.81, 0.82, and 0.83. Then, the penalty is a long waiting time before the best node counts down its large BO number.

According to the below embodiments, a multiple-stage selection is therefore proposed for the above situations.

Figure 4:
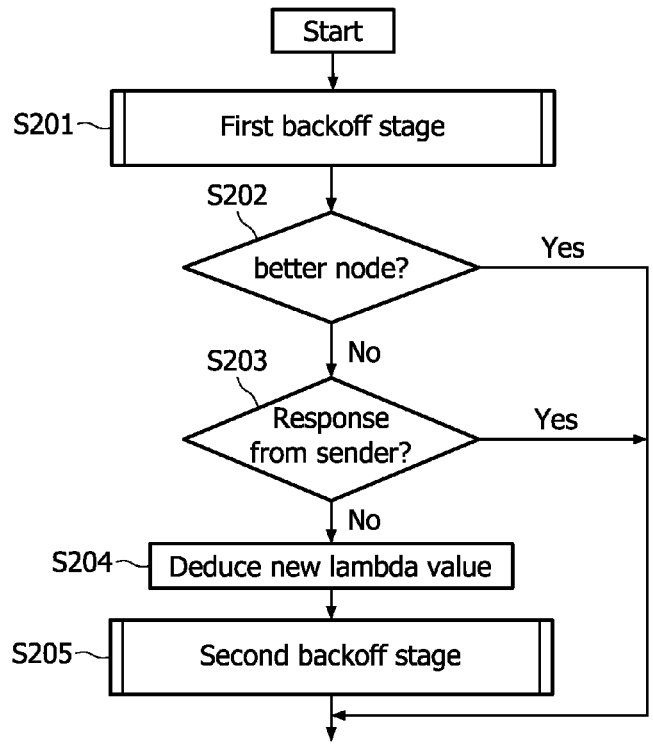
FIG. 4 shows a flow diagram of a multi-stage backoff process at a cooperative node according to a first embodiment.

FIG. 4 shows a flow diagram of a multi-stage backoff process according to a first embodiment, which may be performed at each of the cooperative nodes 21 to 23. In this embodiment feedback from the sender after the first contention stage is not needed when all nodes can hear each other by carrier sensing mechanism.

Figure 2:
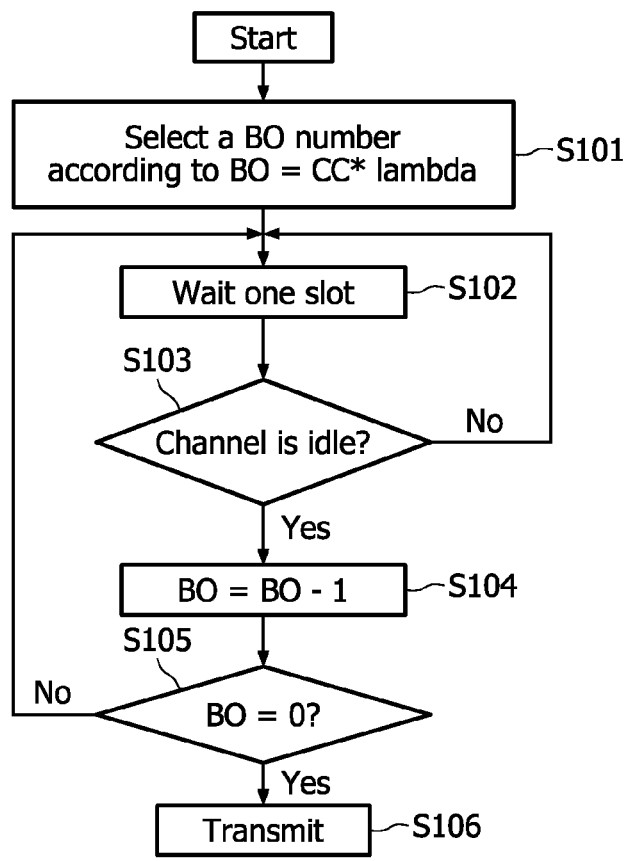
FIG. 2 shows a flow diagram of a procedure for determining a backoff number at a cooperative node.

In step S201, a first backoff stage is performed similar to FIG. 2. Then, the concerned cooperative node checks in step S202 whether it has detected a better cooperative node during the first backoff stage, e.g., whether an earlier CTS response has been received from another cooperative node. If yes, the multi-stage backoff procedure ends for this cooperative node. Otherwise, if no better cooperative node has been detected, it is checked in step S203 whether a response has been received from the source node (or sender) 10. If yes, the multi-stage backoff procedure ends for this cooperative node. Otherwise, if no response has been received from the source node 10, a new lambda value is deduced based on the above findings and the own channel conditions (step S204), and a second backoff stage (similar to FIG. 2) is performed in step S205 by using a second BO number calculated on the basis of the new lambda value.

Figure 5:
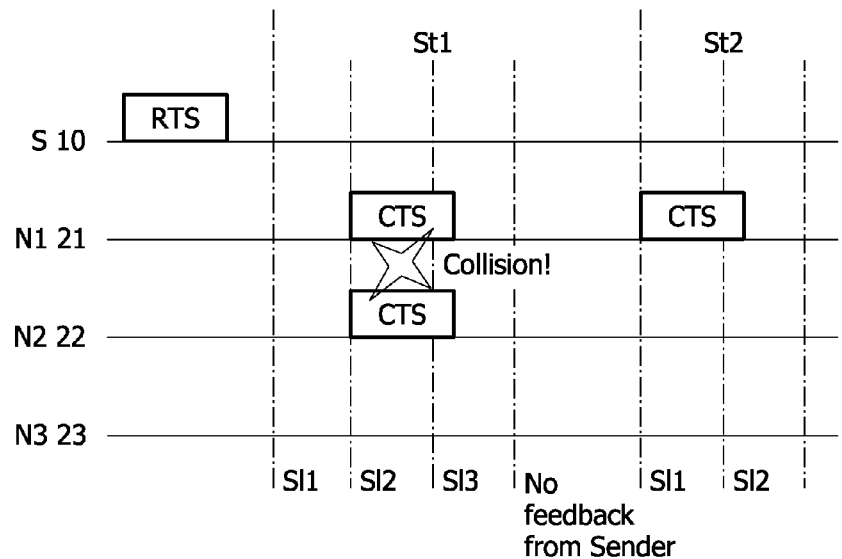
FIG. 5 shows a schematic signaling diagram of an exemplary multi-stage backoff process according to the first embodiment.

FIG. 5 shows a schematic signaling diagram of an exemplary multi-stage backoff process according to the first embodiment. Here, the cooperative nodes 21 to 23 are assumed to have channel conditions CC of 0.45, 0.55, and 0.88 respectively. A first (small) lambda value of 3 will give BO numbers of 2, 2, and 3 for each node respectively. Thus, the cooperative nodes 21 and 22 will sense no transmission in the first slot S11 and will transmit their CTS packets simultaneously in the second slot S12. Yet a collision will occur at the source node 10. The third cooperative node 23 can then learn from the second slot S12 by carrier sensing that there are nodes having better condition than itself (see step S202 in FIG. 4). Thus, the multi-stage backoff procedure ends here for the third cooperative node 23.

After some predefined time to allow CTS reception at the source node 10, the source node 10 will simply do nothing as there was a collision in the first contending or backoff stage. In the second contending or backoff stage, the first and second cooperative nodes 21 and 22 will learn from the absence of a potential response from the source node 10 that there was a collision at the source node 10. And they also learned from their own knowledge there was no node sending in the first slot in the first contending stage. Therefore, the first and second cooperative nodes 21 and node 22 concludes that they should contend a second time by applying a new backoff counter to perform the second backoff stage according to step S205 of FIG. 4. The first and second cooperative nodes 21 and 22 know now that there is no collision in the first slot out of the total three slots and there is no node with condition better than 0.33 (⅓). Hence, each node deduces in step S204 of FIG. 4 the value 0.33 from its channel condition value and multiplies again with a new, possibly larger, lambda value, e.g. 5. the first and second cooperative nodes 21 and 22 will then have the following BO numbers for the second stage: 1, 2. Hence, the first cooperative node 21 will then be able to successful transmit a CTS and be identified as the best cooperative node.

In general, the cooperative nodes 21 to 23 can, by definition, be reached by the source node 10, but they can be hidden from each other. In this case, a single stage selection will likely to fail anyway as a CTS packet transmitted back by the best cooperative node that waits a shorter number of slots will likely be corrupted by another CTS packet transmitted back by another cooperative node that is hidden from the best cooperative node and waits a longer slot number but before the first CTS finishes.

Figure 6:
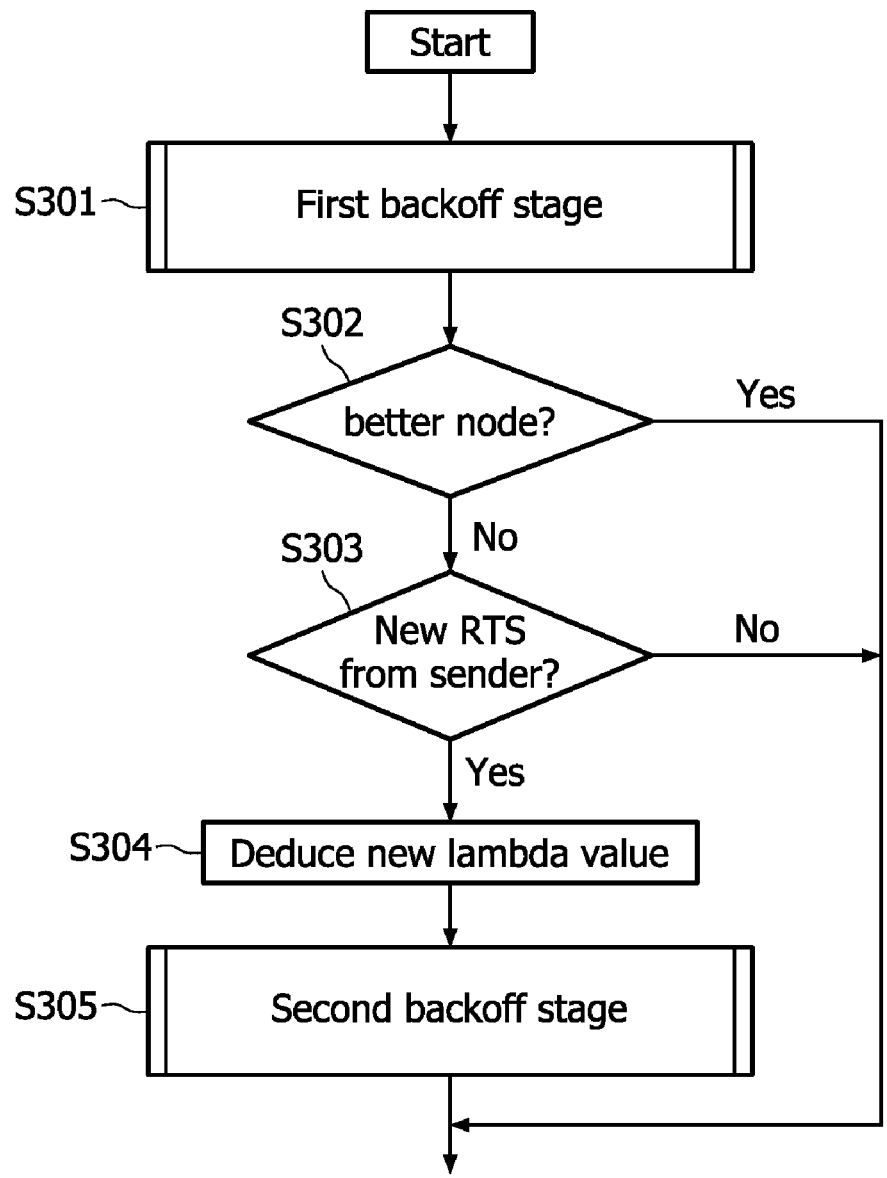
FIG. 6 shows a flow diagram of a multi-stage backoff process at a cooperative node according to a second embodiment.

FIG. 6 shows a flow diagram of a multi-stage backoff process at a cooperative node according to a second embodiment which relates to a multiple-stage selection well suited for the above situations.

In step S301, a first backoff stage is performed similar to FIG. 2. Then, the concerned cooperative node checks in step S302 whether it has detected a better cooperative node during the first backoff stage, e.g., whether an earlier CTS response has been received from another cooperative node. If yes, the multi-stage backoff procedure ends for this cooperative node. Otherwise, if no better cooperative node has been detected, it is checked in step S303 whether a new RTS message has been received from the source node (or sender) 10. If not, the multi-stage backoff procedure ends for this cooperative node. Otherwise, if a new RTS message has been received from the source node 10, a new lambda value is deduced based on the above findings and the own channel conditions (step S304), and a second backoff stage (similar to FIG. 2) is performed in step S305 by using a second BO number calculated on the basis of the new lambda value.

Figure 7:
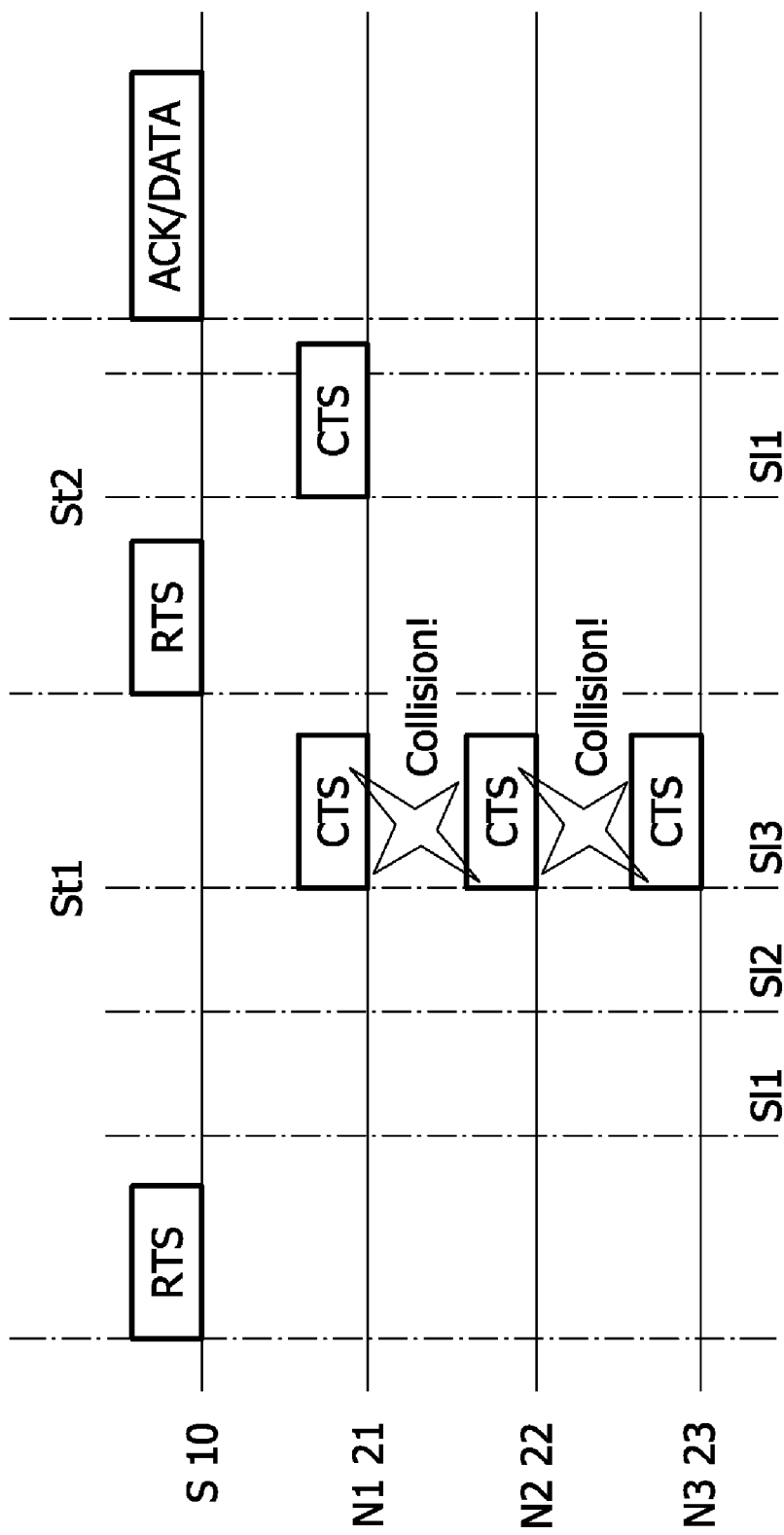
FIG. 7 shows a schematic signaling diagram of an exemplary multi-stage backoff process according to the second embodiment.

FIG. 7 shows a schematic signaling diagram of an exemplary multi-stage backoff process according to the second embodiment. Here, the cooperative nodes 21 to 23 are assumed to have channel conditions CC of 0.68, 0.78, and 0.88, respectively. A first (small) lambda value will give BO numbers of 3, 3, and 3 for all nodes. Hence in the third slot S13, all cooperative nodes 21 to 23 are transmitting CTS packets back, which results in a collision at the source node 10. The source node 10 learns that the channel is idle in slots S11 and S12, but the channel experiences a collision in slot S13. It concludes that all cooperative nodes 21 to 23 have more or less the same (bad) channel conditions. Hence, in the second contention or backoff stage, the sender feeds this info back to all cooperative nodes 21 to 23 in a second RTS packet. All cooperative nodes know now there was no collision in the first two slots out of the total of three slots and there was no node with condition better than 0.67 (⅔). Hence, each node deduces 0.67 from its own channel condition and multiplies again with a new, possibly larger, lambda value, e.g. 50. the cooperative nodes 21 to 23 will then have the following BO numbers for the second stage: 1, 6, and 11. Thus, the first cooperative node 21 will be able to successful transmit a CTS and be identified as the best cooperative node.

Figure 8:
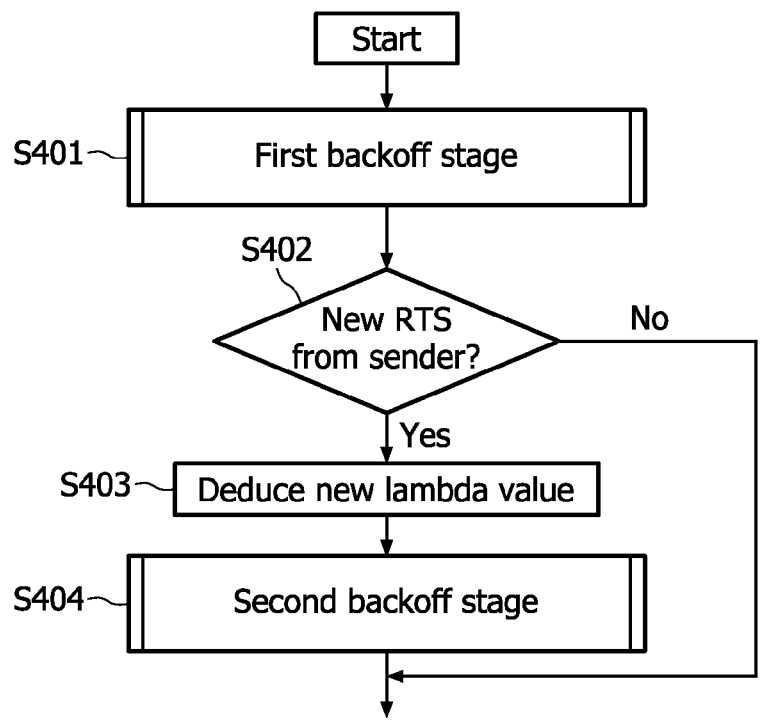
FIG. 8 shows a flow diagram of a multi-stage backoff process at a cooperative node according to a third embodiment.

FIG. 8 shows a flow diagram of a multi-stage backoff process at a cooperative node according to a third embodiment. This embodiment illustrates that the proposed multi-stage selection process can be used iteratively for selecting not only one best cooperative node, but also the first few best cooperative nodes. This may be very useful in cooperative communication schemes, as described for example in A. Nosratinia, T. E. Hunter, and A. Hedayat, "Cooperative communication in wireless networks", IEEE Communications Magazine, October 2004.

In step S401, a first backoff stage is performed similar to FIG. 2. Then, the concerned cooperative node checks in step S402 whether a new RTS message has been received from the source node (or sender) 10. If not, the multi-stage backoff procedure ends for this cooperative node. Otherwise, if a new RTS message has been received from the source node 10, a new lambda value is deduced based on the above findings and the own channel conditions (step S403), and a second backoff stage (similar to FIG. 2) is performed in step S404 by using a second BO number calculated on the basis of the new lambda value.

Figure 9:
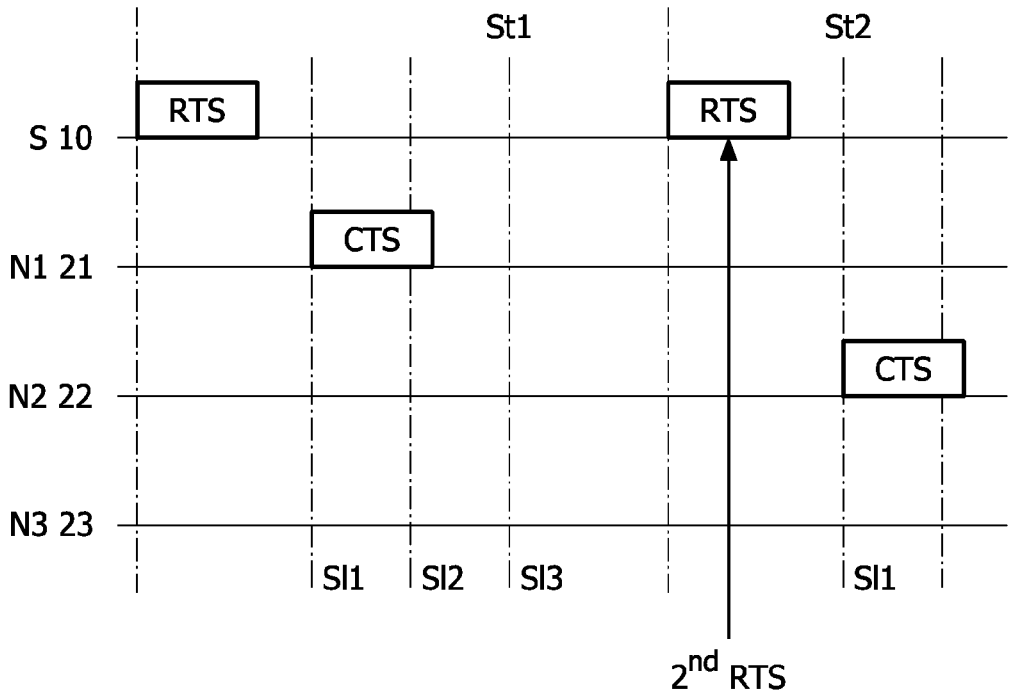
FIG. 9 shows a schematic signaling diagram of an exemplary multi-stage backoff process according to the third embodiment.

FIG. 9 shows a schematic signaling diagram of an exemplary multi-stage backoff process according to the third embodiment, where all cooperative nodes 21 to 23 are assumed to be not hidden from each other.

Here, the cooperative nodes 21 to 23 are assumed to have channel conditions CC of 0.25, 0.55, and 0.85 respectively. Assuming lambda is now 3 for the first backoff stage in step S401 of FIG. 8. In the first backoff stage, the first cooperative node 21 is thus identified as a best cooperative node, as it transmits in slot S11. The source node 10 however still needs to know a second best cooperative node and hence transmits a second RTS in the second backoff stage soliciting the second best cooperative node. As the second best cooperative node can only be in the second slot S12 or the third slot S13 in the first backoff stage, the remaining second and third cooperative nodes 22 and 23 deduce 0.33 (corresponding to 1 slot out of 3 slots) and multiply a new lambda value say 3 again. Now, the second best cooperative node wins contention by sending out a CTS earliest in the second backoff stage.

In the following, an exemplary processing scheme for the source node 10 is described in more detail.

Figure 10:
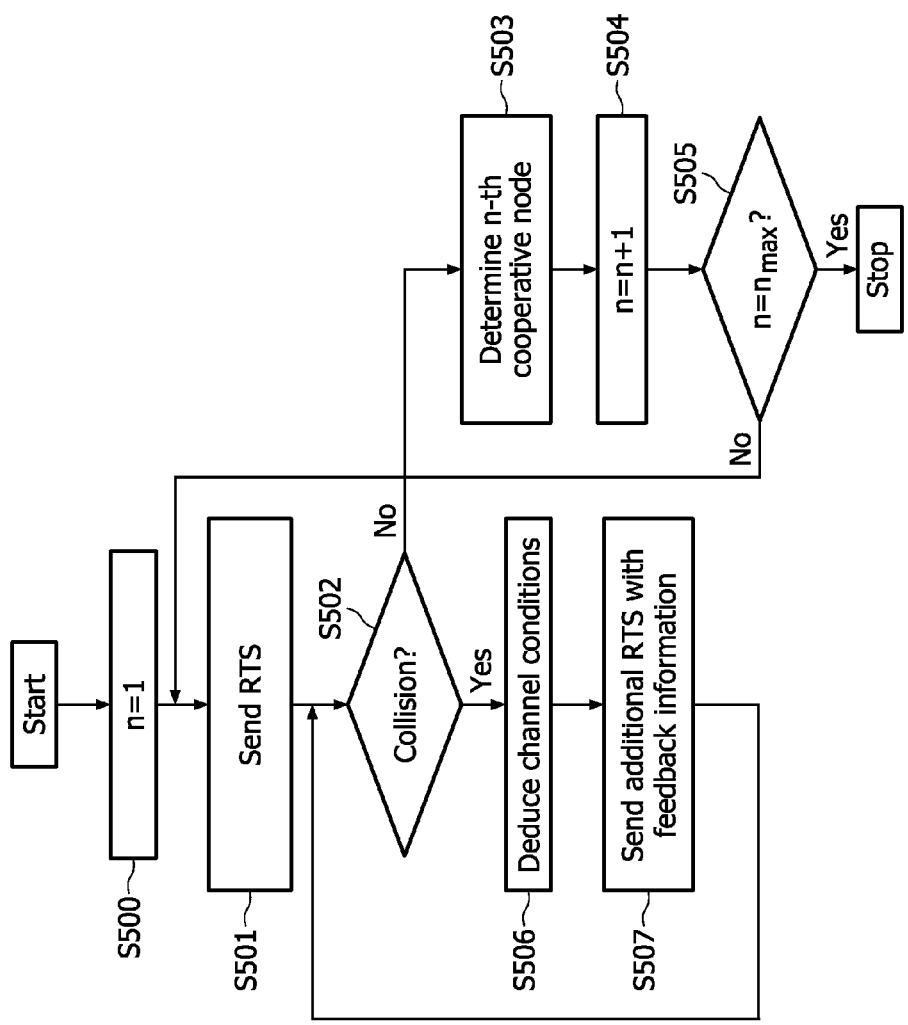
FIG. 10 shows a flow diagram of a multi-stage backoff process at a source node according to a fourth embodiment.

FIG. 10 shows a flow diagram of a multi-stage backoff process at the source node 10 according to a fourth embodiment.

In a first initial step S500 a running variable n is set to 1. Then, in step S501, the source node 10 sends an RTS message to initiate a first backoff stage. Then, it checks in step S502 whether a collision has occurred among the CTS responses from the cooperative nodes 21 to 23. If not, the n-th best cooperative node is determined in step S503 based on the fastest CTS response. Then, the running variable n is incremented in step S504 and it is checked in step S505 whether a maximum value $n_{max}$ has been reached. If so, the multi-stage backoff procedure ends. Otherwise, if the maximum value $n_{max}$ has not yet been reached, the procedure jumps back to step S501 and a new RTS message is sent to determine a second best cooperative node, and so on.

If however a collision is determined in step S502, channel conditions to the cooperative nodes 21 to 23 are deduced in step S506 based on the received CTS responses and an additional RTS message is sent in step S507 to initiate a further backoff stage. Steps S502, S506, and S507 are repeated until no collision is detected in step S502 and the n-th best cooperative node can be determined in step S503.

Hence, in the fourth embodiment, the proposed multi-stage backoff procedure is used for both faster selection of a single best cooperative node and selection of several best cooperative nodes.

Figure 11:
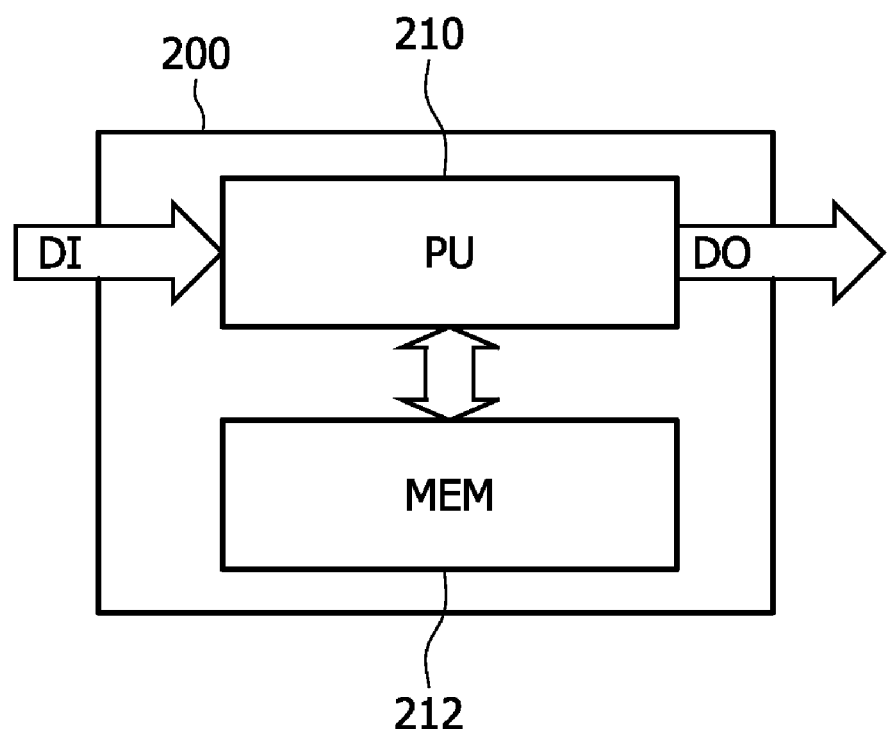
FIG. 11 shows a schematic block diagram of a software-based implementation of various embodiments.

FIG. 11 shows a schematic block diagram of a software-based implementation of the proposed selection mechanism. Here, the source node 10 and the cooperative nodes 21 to 23 each comprise a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above functionalities described in connection with the respective FIGS. 4, 6, 8, and 10. These processing steps may be performed on the basis of input data DI and may generate output data DO, wherein at the source node 10 the input data DI may correspond to received CTS responses and the output data DO may correspond to or initiate a new RTS message or request with additional feedback information for the second and further backoff stages. On the other hand, at the cooperative nodes, the input data may correspond to received RST request (from the source node 10) or CTS response (from other cooperative nodes) and the output data may correspond to or initiate a CTS response.

At this point, it is noted that the functionalities of FIGS. 4, 6, 8, and 10 may as well be implemented as discrete hardware or signal processing units.

In summary, a method, apparatuses, a system, and a computer program product have been described for selecting at least one destination node from multiple destination nodes 21 to 23 for receiving a signal from a source node 10, wherein at least two stages of a backoff process are provided, in which the candidate destination nodes 21 to 23 determine respective backoff numbers according to their channel conditions to the source node 10, wherein the second stage is performed if the first stage was not successful or if a second destination node shall be selected.

It is noted that the present invention is not restricted to the above embodiments and can be used for any other network types, such as virtual cellular networks, where one-hop communication takes place between mobile stations and access points, or multi-hop ad hoc networks, including sensor networks. Moreover, the present invention is applicable to ongoing IEEE 802.11 standards, e.g., IEEE 802.15.5 standardization and their future extensions. Furthermore, the proposed selection scheme may be used for selecting other destination nodes, so that the term "cooperative node" is intended to cover any kind of destination or target node which could be selected by a source or sending node. In addition, the backoff number which determined the response timing may be calculated by using any suitable parameter other then the channel condition and the lambda value.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements. Moreover, any reference sign does not limit the scope of the claims.

The invention claimed is:

1. An apparatus for selecting a cooperative node to which a signal is to be transmitted from a source node, said apparatus comprising:

a processing unit configured to determine in a first stage of a backoff process a first backoff number based on a channel condition between the cooperative node and said source node, and to determine in a subsequent second stage of said backoff process at least a second backoff number based on a subsequent channel condition between the cooperative node and said source node and based on a reaction of at least one of said source node and other candidate cooperative nodes in said first stage of said backoff process; and a memory.

2. The apparatus according to claim 1, wherein said apparatus is configured to determine based on said reaction of said source node at the end of each backoff stage, whether a current stage of said backoff process was successful.

3. The apparatus according to claim 2, wherein said apparatus is configured to determine whether said current stage was successful, based on at least one of an absence of a response from said source node and a reaction made by another candidate cooperative node.

4. The apparatus according to claim 2, wherein said apparatus is configured to determine whether said current stage was successful, based on a feedback from said source node to cooperative nodes at the end of said first stage, said feedback comprising information about whether a selection of the cooperative node was performed successfully.

5. The apparatus according to claim 4, wherein said feedback from said source node comprises an information indicating which cooperative nodes are excluded from said second stage of said backoff process.

6. The apparatus according to claim 1, wherein said apparatus is configured to determine said second backoff number based on an information obtained from the determination of whether a current stage was successful.

7. The apparatus according to claim 1, wherein said apparatus is configured to use a number of idle slots in said first stage of said backoff process to calculate a corresponding channel condition number.

8. The apparatus according to claim 7, wherein said apparatus is configured to subtract said corresponding channel condition number from an original channel condition number of said first stage in order to calculate said second backoff number.

9. The apparatus according to claim 7, wherein a feedback from said source node comprises a suggested new value of a factor to be combined with said corresponding channel condition number to obtain said second backoff number.

10. An apparatus for selecting at least one cooperative node to which a signal is to be transmitted from said apparatus, said apparatus comprising:

a processing unit configured to initiate a first stage of a backoff process in which candidate cooperative nodes determine backoff numbers according to channel conditions between the candidate cooperative nodes and said apparatus, and to initiate a subsequent second stage of said backoff process if said first stage was not successful or if a second cooperative node shall be selected; and a memory.

11. The apparatus according to claim 10, wherein said apparatus is configured to generate a response to said candidate cooperative nodes in response to a detection of a collision during said first stage of said backoff process or to provide a feedback to said candidate cooperative nodes at the end of said first stage, said feedback indicating whether a selection of said cooperative node was performed successfully.

12. The apparatus according to claim 11, wherein said feedback comprises one of: 1) an information indicating which cooperative nodes are excluded from said second stage of said backoff process and 2) a suggested new value of a factor to be combined with said corresponding channel condition number to obtain a backoff number at said candidate cooperative nodes.

13. A method of selecting at least one cooperative node from multiple cooperative nodes for receiving a signal from a source node, said method comprising:

determining by the at least one candidate cooperative node in a first stage of a backoff process a first backoff number, based on a channel condition to said source node; and determining by the at least one candidate cooperative node in a subsequent second stage of a backoff process a second backoff number, based on a subsequent channel condition between the at least one candidate cooperative node and said source node, the subsequent second stage performed when said first stage was not successful or when a second cooperative node shall be selected.

14. The method of claim 13 further comprising:

determining whether the first stage was successful, based on at least one of an absence of a response from the source node and a reaction made by another candidate cooperative node.

15. The method of claim 14 further comprising:

determining whether the first stage was successful, based on a feedback from the source node to cooperative nodes at an end of said first stage, said feedback comprising information about whether a selection of a cooperative node was performed successfully or in which slot said selection has failed.

16. A non-transitory computer readable medium comprising software code, which when executed by a processing unit producing the method claim 13.

* * * * *